US012376666B2

(12) United States Patent
Greiner-Perth et al.

(10) Patent No.: US 12,376,666 B2
(45) Date of Patent: Aug. 5, 2025

(54) MASSAGE APPLICATOR

(71) Applicants: Aptar Radolfzell GmbH, Radolfzell (DE); HALEON CH SARL, Prangins (CH)

(72) Inventors: Jürgen Greiner-Perth, Gottmadingen (DE); Sylvain Patrice Dominique Fradin, Nyon (CH)

(73) Assignee: HALEON CH SARL, Prangins (CH)

( * ) Notice: Subject to any disclaimer, the term of this patent is extended or adjusted under 35 U.S.C. 154(b) by 0 days.

(21) Appl. No.: 18/734,418

(22) Filed: Jun. 5, 2024

(65) Prior Publication Data

US 2024/0315421 A1 Sep. 26, 2024

Related U.S. Application Data

(63) Continuation of application No. 17/996,106, filed as application No. PCT/EP2021/061587 on May 3, 2021, now Pat. No. 12,059,066.

(30) Foreign Application Priority Data

May 13, 2020 (EP) .................................... 20174489

(51) Int. Cl.

*B43M 11/06* (2006.01)
*A45D 34/04* (2006.01)
*A61H 7/00* (2006.01)
*B05B 11/04* (2006.01)
*B65D 35/36* (2006.01)

(52) U.S. Cl.

CPC ........... *A45D 34/04* (2013.01); *A45D 34/042* (2013.01); *A61H 7/005* (2013.01); *B05B 11/04* (2013.01); *B65D 35/36* (2013.01)

(58) Field of Classification Search

CPC .... A45D 34/04; A45D 34/041; A45D 34/042; A61H 7/005; B05B 11/04; B65D 35/36
USPC ........................................................ 401/183
See application file for complete search history.

(56) References Cited

U.S. PATENT DOCUMENTS 8,177,450 B2 5/2012 Zhang
11,559,126 B1 * 1/2023 Samangooie .......... A45D 34/04
12,214,074 B2 * 2/2025 Sabherwal ............ B65D 35/40
(Continued)

FOREIGN PATENT DOCUMENTS

CN 207312183 U 5/2018
DE 102013214227 A1 1/2015
DE 102018204939 A1 10/2019
(Continued)

OTHER PUBLICATIONS

International Search Report, with English translation, issued in corresponding International Application No. PCT/EP2021/061587, date of mailing Oct. 7, 2021 (11 pages).
(Continued)

*Primary Examiner* — Jennifer C Chiang
(74) *Attorney, Agent, or Firm* — FLYNN THIEL, P.C.

(57) ABSTRACT

A massage applicator for massaging cream-type fluids into the skin, provided with an end wall with a massage region, on which massage elevations are provided. The end wall is penetrated by at least one outlet channel for the cream-type fluid. The massage applicator is provided with suitable markings in the massage region for measuring the fluid to be used.

12 Claims, 3 Drawing Sheets

(56) References Cited

U.S. PATENT DOCUMENTS

| | | | |
|---|---|---|---|
| 2011/0091265 | A1 | 4/2011 | Zhang |
| 2018/0085282 | A1 | 3/2018 | Liu |

FOREIGN PATENT DOCUMENTS

| | | | |
|---|---|---|---|
| EP | 2327632 | A1 | 6/2011 |
| EP | 2511189 | A1 | 10/2012 |
| FR | 2905359 | A1 | 3/2008 |
| KR | 1020130137331 | A | 12/2013 |
| KR | 1020210016729 | A | 2/2021 |
| WO | 2012104162 | A1 | 8/2012 |
| WO | 2019185307 | A1 | 10/2019 |
| WO | 2020015932 | A1 | 1/2020 |
| WO | 2020159079 | A1 | 8/2020 |

OTHER PUBLICATIONS

Written Opinion of International Searching Authority, issued in corresponding International Application No. PCT/EP2021/061587, date of mailing Oct. 7, 2021 (20 pages).

* cited by examiner

MASSAGE APPLICATOR

AREA OF APPLICATION AND PRIOR ART

This is a continuation of prior U.S. application Ser. No. 17/996,106, filed Oct. 13, 2022, which was the National Stage of International Application No. PCT/EP2021/061587, filed May 3, 2021 which claims priority from European Application No. 20174489.3, filed May 13, 2020. The entire contents of U.S. application Ser. No. 17/996,106 and International Application No. PCT/EP2021/061587 are hereby incorporated by reference.

The invention relates to a massage applicator for massaging in cream-type fluids into the skin, and to a massage dispenser having such a massage applicator.

A massage applicator of the type in question has an end wall with a massage region, on which massage elevations are provided. The end wall is penetrated by at least one outlet channel for the cream-type fluid.

The use of such a massage applicator as part of a massage dispenser takes place in such a way that fluid is conveyed by a user from a fluid reservoir onto the massage region and the latter is then pressed onto the skin area on which the fluid is to be used up or introduced. The fluid is massaged in by massaging, for example circular, movement of the massage applicator on the skin.

Commercially available massage applicators and massage dispensers with such massage applicators still have disadvantages, particularly with regard to meterability of the fluid.

PROBLEM AND SOLUTION

The problem addressed by the invention is that of further developing a massage applicator of the type in question in such a way that, with low production costs, it affords advantages over known massage applicators in respect of the meterability of the fluid.

According to the invention, a massage applicator of the type in question for massaging in cream-type fluids, which is designed according to the aspect described below, is proposed for this purpose. Like massage applicators of the type in question, massage applicators according to the invention have an end wall with a massage region, on which massage elevations are provided. The end wall is penetrated by at least one and preferably precisely one outlet channel for the cream-type fluid, so that fluid can pass outward from a fluid reservoir through the outlet channel and initially collects on the massage region. The massage region is preferably round and particularly preferably has a diameter of between 20 mm and 60 mm. Once the desired quantity of the cream-type fluid has been discharged onto the massage region, it is then possible to start application by pressing the massage region onto the skin area to be treated, and here, by, for example, circular movement of the massage applicator, the fluid is distributed and/or introduced into the skin by means of the massage elevations.

According to the invention, it is proposed that markings designed as elevations and/or depressions are provided on the massage region, said markings surrounding the at least one outlet channel and indicating different discharge quantities which are respectively achieved when the fluid discharged through the outlet channel reaches the respective marking on the massage region.

In the case of a massage applicator according to the invention of this type, it is accordingly envisaged that markings are provided on the massage region itself, that is to say the surface surrounding the discharge channel, which markings permit detection of the quantity of fluid already discharged when fluid is discharged onto the massage region. If fluid is discharged by the user, it collects in the massage region. By virtue of the markings according to the invention, the outer edge of the fluid collected on the massage region can serve as an indicator of the quantity discharged. In this case, the markings can be applied, in particular, according to the type of fluid. Since low-viscosity fluids tend to form a thin film, the thickness of which does not depend on the quantity of fluid, the quantity of fluid discharged is approximately the square of the diameter of the accumulated fluid discharged. Viscous fluids, on the other hand, form a thicker layer which becomes thicker the more fluid is discharged. In this case, the quantity of fluid discharged is approximately the cube of the diameter of the fluid discharged.

In the simplest case, a marking according to the invention could be formed by a scale extending radially outward from the discharge channel.

Preferably, however, the markings are provided as circular markings surrounding the at least one outlet channel, in particular as a raised annular structure, which is particularly preferably closed circumferentially or at most has short apertures. Such annular structures have the advantage that the fluid is thereby initially held up, with the result that first of all an inner ring is filled almost completely before the fluid overflows it and then largely fills the next ring. It has been found that this makes it easy for the user to estimate the quantity of fluid discharged.

A particularly simple configuration is possible in which only one marking, in particular a circular marking, is provided, with the result that only a defined quantity of fluid can be deliberately metered. This is expedient particularly when, owing to the type involved, the fluid is always to be discharged in the same quantity. However, configurations are preferred in which at least two markings, particularly preferably at least three markings, are provided which are suitable for metering two or three different fluid quantities.

In principle, it is conceivable for the markings to be designed as elevations and, as such, then also to be used as massage elevations, that is to say also to be responsible for the fluid being massaged into the skin. Thus, it is even conceivable to dispense with any other massage elevations in the massage region. However, it is advantageous if both the mentioned markings for indicating different discharge quantities and additional massage elevations not provided as such markings are provided on the massage region. The massage elevations not serving as markings are preferably provided as small discrete elevations, which can, in particular, be circular. Their outer contour preferably has an extent or diameter of between 1 and 5 mm. A configuration in which no such additional pure massage elevations are provided within the markings is particularly preferred. These are preferably provided exclusively, but at least partially, outside the outermost marking. In this case, they are preferably distributed in a circumferential annular region.

In order to determine the meaning of the markings and, in particular, the respectively assigned quantity of fluid, appropriate inscriptions are preferably provided on the massage dispenser, in particular on the massage applicator. In particular, such an inscription can be a volume specification. As an alternative, however, other indicative inscriptions can be provided, such as “children”, “adolescents” and “adults”. By means of the inscription, the technical function of the markings is immediately recognizable to the user. One possibility for applying the inscription consists in providing each of the markings themselves with an inscription on the massage region indicating the quantity of fluid discharged when the fluid on the massage surface reaches the marking. In order not to impair the distribution of the discharged fluid on the massage region by the inscription, the inscriptions are preferably applied as a print in this case.

An alternative embodiment envisages that an inscription is provided at some other location of the massage applicator or on a fluid reservoir connected to the massage applicator, in particular on the inner side of a lid, which inscription indicates what quantity of fluid has been discharged when the fluid reaches the respective markings on the massage surface. By virtue of this arrangement, it is possible, in particular, for the inscription to be formed directly by the shaping of the massage applicator, thus eliminating a printing process. Arrangement on the inner side of the lid, which is preferably designed as a hinged lid, is of particular advantage since, after the lid has been swung open, this inner side can be kept in view simultaneously with the markings and the emerging fluid in the massage region. Furthermore, it has proven to be particularly intuitive if the inscription spaced apart from the massage region likewise shows the markings, supplemented by the respective volume data of the discharged fluid.

It is regarded as particularly advantageous if at least three markings, in particular in the form of concentric circles, with respective inscriptions are provided. It is regarded as particularly advantageous here if the discharge quantity difference, which can be determined from the inscription, between the two outermost markings is greater than a discharge quantity difference between the two innermost markings. Since, depending on the fluid and its viscosity, the quantity of fluid increases with an exponent between 2 and 3 with the diameter of the respective markings, it would be necessary, in the case of identical discharge quantity differences, for the respective circular markings to be positioned increasingly closer to one another toward the outside, making inscription between the markings more difficult. Increasing discharge quantity differences, for example with three markings, whose inscriptions are 0.5 ml, 1.0 ml and 2.0 ml, are therefore more suitable in practice.

The invention relates not only to the massage applicator itself but also to a massage dispenser for dispensing and massaging in cream-type fluids, which has a fluid reservoir for storing the cream-type fluids before discharge and a massage applicator of the type described.

The fluid reservoir is preferably designed as a squeeze bottle or a tube. The fluid to be discharged and to be massaged in, that is to say, in particular, a pharmaceutical or cosmetic fluid, is stored in the fluid reservoir before discharge.

BRIEF DESCRIPTION OF THE DRAWINGS

Further advantages and aspects of the invention will be found in the claims and the following description of a preferred exemplary embodiment of the invention, which will be explained below with reference to the figures.

DETAILED DESCRIPTION

Figure 1:
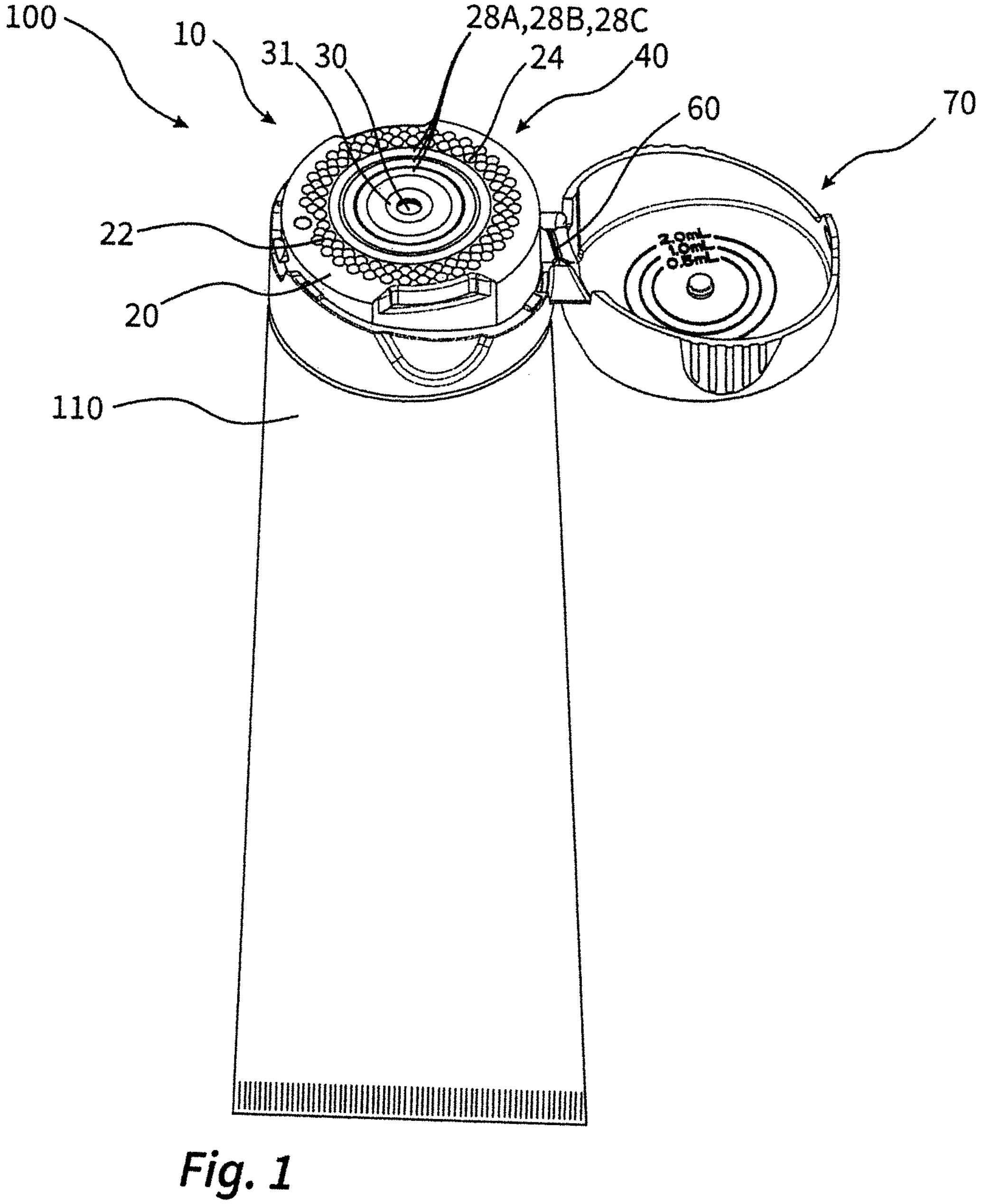
FIG. 1 shows a massage dispenser according to the invention in a perspective overall illustration.

FIG. 1 shows a massage dispenser 100 according to the invention. The latter has a massage applicator 10 and a fluid reservoir 110 in the form of a tube, to the outlet of which the massage applicator 10 is attached.

The massage applicator 10 has a base 40 as part of an outer component 12 and an inner component 14, not visible in FIG. 1. A hinged lid 70 is attached to the base 40 of the massage applicator 10 by means of a hinge 60, which lid is open in the state of FIG. 1.

The dispenser is a massage dispenser. The massage applicator 10 therefore has an end wall 20, on which a massage region 22 is provided, which has elevations 24, 28A, 28B, 28C, which make it possible to apply fluid previously present on the massage region 22 to the skin of the user and to massage it in there effectively. In order to place fluid on the massage region 22, an outlet channel 30 with an outlet 38, which outlet channel 30 is connected to the fluid reservoir 110, is provided in the middle of the massage region 22. On the outlet side, the outlet channel 30 is surrounded by a sealing bead 31, which is designed so as to be raised to approximately the same extent as the massage elevations 24 with respect to the surrounding end wall 20.

When the tubular fluid reservoir 110 is compressed, fluid is discharged here for subsequent application.

Figure 2:
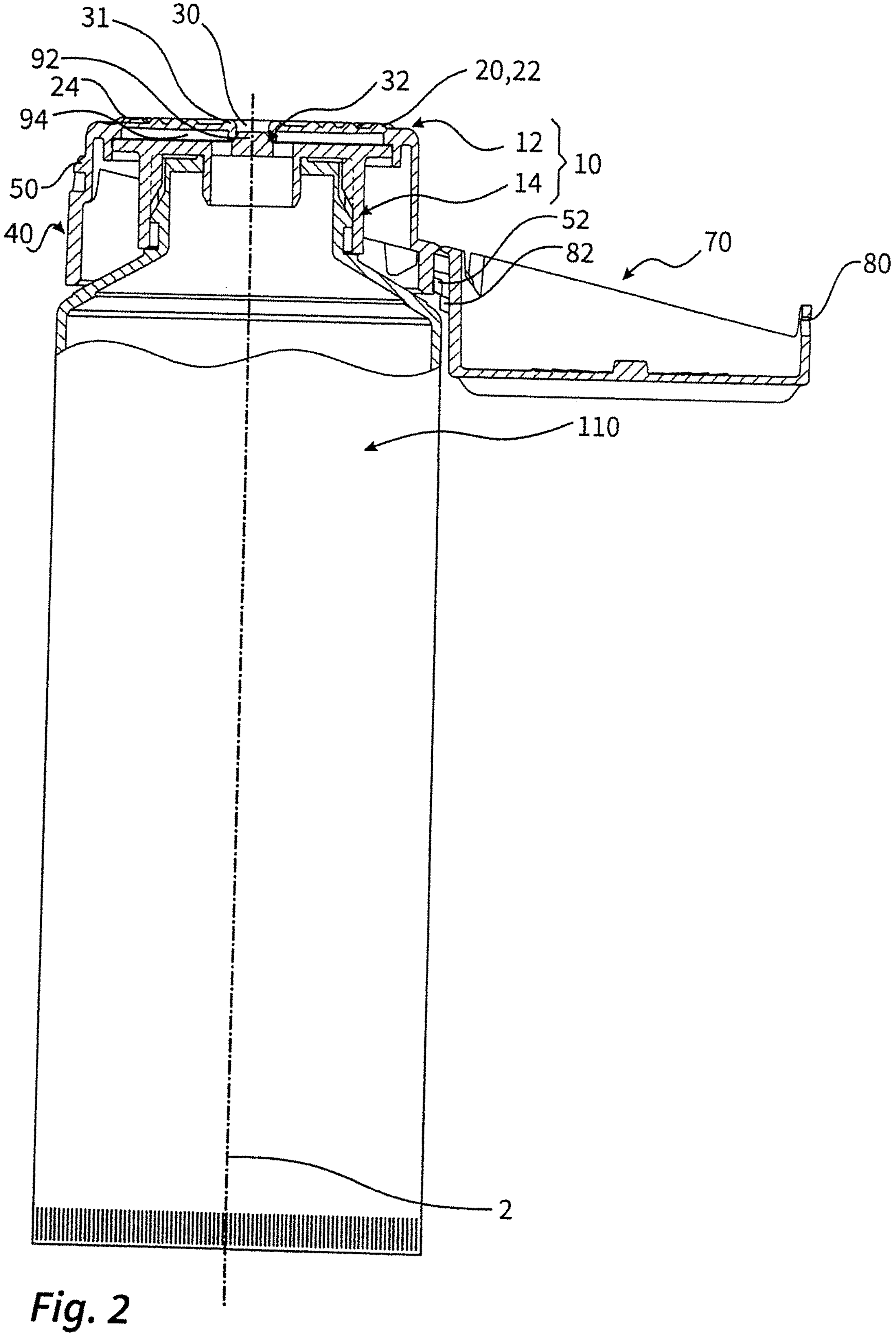
FIG. 2 shows the massage dispenser of FIG. 1 in a sectioned illustration.

FIG. 2 shows the massage dispenser 100 of FIG. 1 in a sectioned illustration. First of all, it can be seen here that the massage applicator 10 is assembled from the two components 12, 14 mentioned. Component 12 forms the outer component 12, which, in particular, forms the end wall 20 with the massage region 22 and the hinged lid 70 covering the massage region 22 in the closed state. The second component 14 is an inner component 14, which, on the one hand, serves to couple the fluid reservoir 110 and, on the other hand, is snapped into the outer component 12. In the middle of the inner component 14, an elevation acting as a valve body 92 is provided, which in a state of rest presses on an inlet 34 of the outlet channel 30 and thus closes the latter.

A valve chamber 94 is formed between the end wall 20 of the outer component 12 and the inner component 14, which is provided with passage channels. If, as a result of pressure on the fluid reservoir 110, the pressure in the valve chamber 94 is also increased, indirectly, through apertures in the inner component 14, this leads to the end wall 20 with the massage region 22 being lifted upward, with the result that an outlet valve 32 formed by the outlet channel 30 and the valve body 92 is opened and the fluid can emerge onto the massage region 22. If the pressure on the fluid reservoir 110 is eliminated, the outlet valve 32 closes again.

Figure 3:
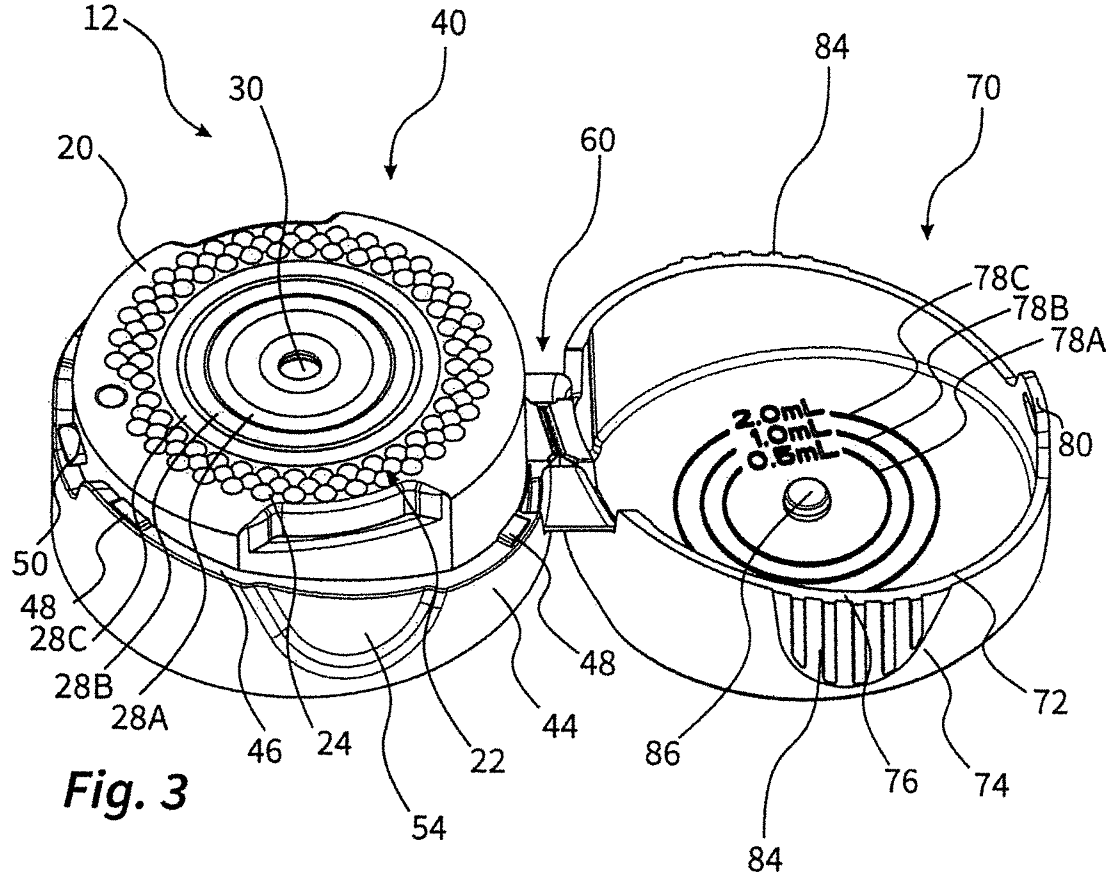
FIG. 3 shows the massage applicator of the massage dispenser in a separate illustration.
Figures 3A, 3B, 3C:
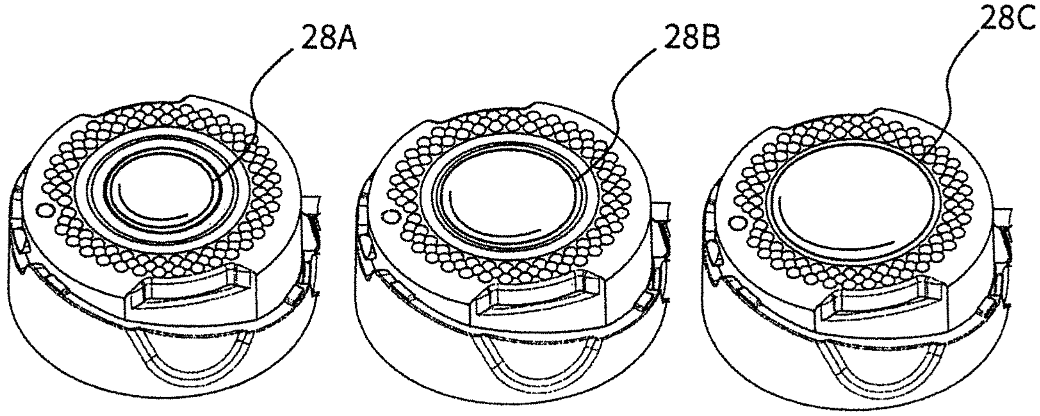
FIGS. 3A to 3C show the massage applicator when discharging different quantities of fluid.

FIGS. 3 to 3C illustrate the particular aspect according to the invention of the massage dispenser 100 and its massage applicator 10.

In FIG. 3, the outer component 12 of the massage applicator 10 is shown in an enlarged representation. As already described above, the massage region 22 is provided on the end wall 20 of the base 40, which end wall can be deformed comparatively easily for the purpose of valve opening. The elevations provided in this massage region 22 serve various purposes. While all the elevations 24, 28A, 28B, 28C serve the purpose of enabling the fluid to be massaged into the skin, the annular elevations 28A, 28B, 28C have a significance which goes beyond this. These elevations form markings which facilitate the discharge of a defined quantity of fluid. As can be seen on the right-hand side in FIG. 3, an inscription 78A, 78B, 78C is provided on the inner side of the hinged lid 70. This comprises three concentric circles, which are each assigned to one of the raised rings 28A, 28B, 28C in the massage region 22 and which are each provided with a volume value. It can be seen from this that a volume of 0.5 ml is achieved during the discharge of fluid when the fluid reaches the innermost raised ring 28A during discharge. If additional fluid is discharged, it will overflow ring 28A and initially extend as far as ring 28B. The user then knows that he has discharged about 1 ml of the fluid in accordance with inscription 78B. If still more fluid is required, the user can discharge further fluid until it reaches the last raised ring 28C. In accordance with inscription 78C, a quantity of fluid of approximately 2 ml has then been discharged.

The diameter which the annular elevations 28A, 28B, 28C must have in order to be able to receive the respectively assigned volume on the inside also depends on the fluid to be discharged and its viscosity. The diameters of the annular elevations 28A, 28B, 28C are therefore preferably adapted to suit the fluid contained in the fluid reservoir 110.

FIGS. 3A to 3C illustrate the distribution of a fluid volume of 0.5 ml, 1.0 ml and 2.0 ml.

The annular markings 28A to 28C thus allow the user to discharge in a simple manner the quantity of fluid desired by him and possibly prescribed by a doctor, without a complex metering mechanism, for example by means of a pump, being required for this purpose. In addition, the markings 28A, 28B, 28C as elevations are also expedient when massaging in the fluid.

The other elevations 24, which are designed in the form of smaller round elevations, serve exclusively for the massaging effect.

The invention claimed is:

1. A device for massaging in and dispensing cream-type fluids, the device comprising a massage applicator having an end wall with a massage region, massage elevations provided on the massage region, the end wall being penetrated by at least one outlet channel for dispensing the cream-type fluid, and markings configured as elevations or depressions provided on the massage region, said markings surrounding the at least one outlet channel and indicating different discharge quantities respectively achieved when the fluid discharged through the at least one outlet channel reaches the respective marking on the massage region.

2. The device as claimed in claim 1, wherein the markings comprise circular markings surrounding the at least one outlet channel.

3. The device as claimed in claim 2, wherein the at least one outlet channel comprises precisely one outlet channel, the outlet channel being arranged centrally on the massage region.

4. The device as claimed in claim 2, wherein at least two circular markings are provided.

5. The device as claimed in claim 1, wherein both the markings for indicating different discharge quantities and additional massage elevations not provided as such markings are provided on the massage region.

6. The device as claimed in claim 5, wherein the massage elevations not provided as markings are configured in the form of individual elevations which are not configured to surround the at least one outlet channel.

7. The device as claimed in claim 5, wherein the massage elevations not provided as markings are provided outside an outermost marking.

8. The device as claimed in claim 1, wherein:

the markings are each provided with an inscription on the massage region indicating the quantity of fluid discharged when the fluid on the massage surface reaches the marking; or inscriptions are provided at some other location of the massage applicator or on a fluid reservoir connected to the massage applicator, the inscriptions indicating what quantity of fluid has been discharged when the fluid reaches the respective markings in the massage region.

9. The device as claimed in claim 8, wherein at least three markings are provided which indicate different discharge quantities and each of which includes an inscription, wherein a discharge quantity difference between outermost ones of the markings is greater than a discharge quantity difference between innermost ones of the markings.

10. The device as claimed in claim 1, wherein the massage region has a substantially round shape and a diameter of between 20 mm and 60 mm.

11. The device as claimed in claim 1, further comprising a fluid reservoir for storing the cream-type fluid before discharge from the at least one outlet channel, the massage applicator being connected to the fluid reservoir.

12. The device as claimed in claim 11, wherein the fluid reservoir is filled with a pharmaceutically or cosmetically active cream.

* * * * *